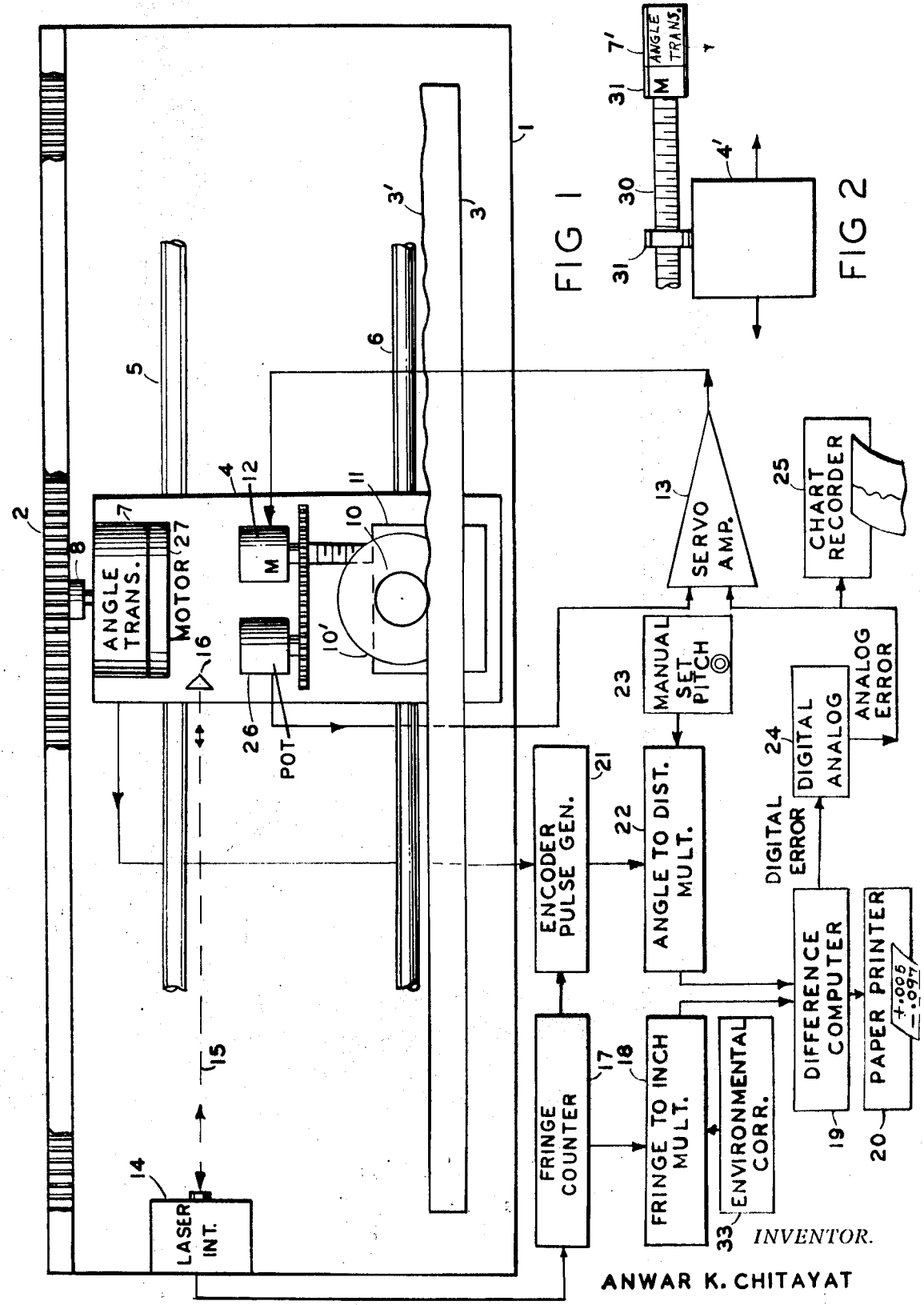
Patented Sept. 20, 1971

3,605,552
MEANS FOR GENERATING COMPENSATING MEANS
Anwar K. Chitayat, Plainview, N.Y., assignor to OPTOmechanisms, Inc., Plainview, N.Y.
Continuation-in-part of abandoned application Ser. No. 652,516, July 11, 1967. This application June 2, 1969, Ser. No. 835,873
Int. Cl. B23c 1/16
U.S. Cl. 90—13C 18 Claims

ABSTRACT OF THE DISCLOSURE

Automatic means for cutting compensating cams for long lead screw and racks such as those used in precision machine tools. The workpiece lead screw or rack is mounted parallel to the cam to be cut. A movable platform mounts a milling cutter. The platform is also connected to the lead screw by a nut or to the rack by a pinion. Angular motion of the lead screw or pinion is measured and transmitted to a computer. The linear motion of the platform is measured with an interferometer. The two measurements are compared in the computer and the output is fed to a servo mechanism which controls the milling cutter. Therefore, as the platform moves down along the workpiece, the cam is automatically cut. A chart or digital printed tape output may also be provided.

This application is a continuation-in-part of my prior copending application, Ser. No. 652,516, filed July 11, 1967 for Means for Generating Compensating Cams, now abandoned.

This case contains subject matter common to prior copending applications:

Ser. No. 578,201, Lead Screw Measuring Means, filed Sept. 9, 1966, now Pat. 3,515,481.

Ser. No. 594,213, Environmental Correction Computer, filed Nov. 14, 1966, now Pat. 3,520,613.

Ser. No. 602,644, Thread Grinding Means, filed Dec. 19, 1966, now Pat. 3,486,275.

This invention relates to means for automatically cutting compensating cams for long lead screws or racks of the type used in large precision machine tools such as precision lathes, etc.

In many machine tool applications, correction cams are used to compensate for errors of lead screws or rack and pinion measuring systems. These cams can be located along the full length of the rack or screw such that at different locations, the cam is shaped to compensate for these errors. The cam is used in one of two basic configurations:

(1) Rotate the nut or pinion relative to its support to realize the required compensation, or (2) To provide an electronic error signal or correcting voltage through a transducer or differential transformer. The latter method is used largely in numerically controlled machines.

The purpose of the present invention is to detail an automatic method for measuring screw errors and automatically manufacturing correction cams while the errors are being checked with a laser interferometer. The objectives are:

(1) To reduce the time of checkout and manufacture or correction cams, and eliminate the tedious and time consuming process.

(2) Minimize the possibility of operator error in checking and machining by using a semi-automatic or automatic system.

(3) Improve the accuracy of manufacturing by using a laser interferometer, whose output is compensated for changes in environmental conditions to result in a highly accurate linear measuring system.

(4) The linear displacements are compared through a digital computer with the angular readout of an encoder resulting in digital errors which are continuously sampled to manufacture the correction cams. This digital technique results in a measuring and manufacturing system which is superior in accuracy to presently utilized methods.

A principal object of this invention is to provide new and improved means for automatically cutting compensating cams.

Another object of the invention is to provide new and improved means for automatically forming compensating cams with a servo controlled milling cutter.

Another object of the invention is to provide new and improved means for cutting compensating cams for lead screws comprising means to measure the angular motion of the lead screw, means to compute the projected linear motion therefrom, means to measure the actual linear motion with an interferometer and means to compare the two linear measurements to adjust the milling cutter.

Another object of the invention is to provide new and improved means to automatically cut cams for precision lead screw work pieces comprising a base, means to rotatably mount a lead screw on said base, means connected to rotate said lead screws, means to fixedly mount a cam body on said base parallel to said lead screw, a platform adapted to travel along said base in a direction parallel to the axis of said lead screw and said cam, a cutter mounted on said platform and adapted to cut said cam, an angular transmitter connected to said lead screw and adapted to transmit signals proportional to the angular rotation of said lead screw, interferometer means adapted to measure the linear travel of said platform, means connected to said angular transmitter to convert said angular information to computed linear travel, means connected to said conversion means and said interferometer to measure the difference between said computed travel and said interferometer measured travel of said platform, servo means connected to said cutter and connected to be responsive to said difference measuring means to control said servo means to control the depth of cutting of said cam.

These and other objects of the invention will be apparent in the following specification and drawings of which:

FIG. 1 is a schematic drawing of an embodiment of the invention showing a rack.

FIG. 2 is a detail of a modification illustrating the use with a lead screw.

The system is shown schematically in FIG. 1. The system utilizes an angular encoder or pulse generator tied directly to the pinion of a rack or tied to the drive of a lead screw. The output of this angular readout is presented to a special purpose computer which converts the angular readout to the desired linear displacement by multiplying by a fixed factor (lead). The operator merely dials in the "lead" of the rack and pinion associated with the angular readout systems. The laser interferometer measures the actual distance traversed by the slide platform 4 which is corrected for environmental conditions of the part and air path. The laser output is then compared to the converted output of the angular encoder. The difference is then determined by digital subtraction using a digital comparator resulting in an output error with a positive or negative sign. This output error is automatically printed out by a printer on paper for future reference. The printer is not necessary for the correction cam manufacture, but is available if desired.

The digital output error is converted to D.C. error signal proportional to the error. This same signal can be placed on a standard paper chart recorder to result in a recording of error versus displacement. The chart recorder is not necessary for the manufacture of the correction cam, but is provided for reference only.

The correction cam manufacture is achieved by using a milling head containing a milling cutter.

The milling head is placed on a slide which is driven by a servo motor. This motor is driven by the error signal which is compared to a servo potentiometer geared to the servo motor. Thus, for example, if an error of .0005" is measured, then an error voltage is developed of 0.5 volt. The slide must then move so that the cam is corrected by the proper amount determined by a scale factor. Thus, if the cam must have a factor of correction of 26:1, than the cam must be corrected by .0005"×26=.013". The potentiometer is geared so that its output voltage is 0.5 volt per .013" motion. Consequently, the servo motor drives until the correction of .013" is achieved.

The above correction is achieved continuously while the slide is moving at an approximately constant speed. Thus, it may only require 10 (ten) minutes to manufacture a cam, 200" long.

More specifically to the figures, the invention is mounted on a base 1. Fixedly mounted on the base 1 is a rack 2 for which the compensating cam 3 is to be generated. The rack 2 and the cam 3 are fixedly mounted in parallel relation by conventional means. A platform 4 is mounted for movement parallel the axes of the rack and cam on rails 5 and 6 which are mounted on the base 1. Mounted on the platform 4 is a milling cutter 10 which is movably mounted on the platform by means of a pivotal or reciprocating slide member 11. The slide member 11 is adapted to move perpendicular to the axis of the cam 3 so as to form the compensating surface 3'. The slide member 11 and the cutter 10 are controlled by the servo motor 12.

The servo motor 12 is controlled by a signal which is generated in the servo amplifier 13. The servo amplifier is controlled by the error between the angular information from the angular transmitter 7, and the linear measurement which is generated by the laser interferometer 14. The interferometer 14 is mounted on the base 1 and sends a beam 15 to a reflector 16 which is mounted on the platform 4. The interferometer 14 may be conventional and it generates fringes which are counted by the fringe counter 17. The output of the fringe counter 17 is fed to a fringe-to-inch computer 18 which may be conventional multiplier. The output of the computer 18 is fed to digital computer 19 the output of which may be used to print out a digital tape showing the errors in inches by means of the printer 20. If desired, an environmental correction computer may be connected to the fringe to inch computer 33. The Environmental Correction Computer may be that disclosed in my copending application, S.N. 594,213, filed Nov. 14, 1966 now Pat. 3,520,613.

The angular information from pinion gear 8 and the connected angle transmitter 7 is fed to an encoder 21 which may be a pulse generator. The output of the encoder 21 is fed to an angle-to-distance computer 22 which may be a multiplier, which multiplies the angular rotation times the pitch of the screw of rack. The pitch or lead may be manually set in the multiplier by means of the adjustment means 23. The difference computer 19 computes the error between the linear information and the angular information is converted to distance and this is fed to the digital to analog converter 24, the output of which is fed to the servo amplifier 13. If desired, this output may also be fed to a chart recorder 25 for printing a record or to tape generator 20. This output may also be fed to other utilization devices.

The other input to the servo amplifier 13 is a feed back from potentiometer 26 which feeds back the actual position of the cutter 10. The difference between these two inputs is amplified and fed to the servo motor 12 to change the position of the cutter 10.

Therefore, as the platform 4 is moved from right to left in FIG. 1, the cam 3 will automatically be cut by the milling cutter 10 which is continuously driven by its own motor 10'. The motion of the platform may be provided by conventional means, for instance, a motor 27 connected to drive the pinion gear 8.

FIG. 2 shows a detail modification for cutting a compensating cam for a lead screw 30 instead of the rack 2. This arrangement is identical to that of FIG. 1 except that the lead screw 30 is rotated by means of the motor 31, the angular information is transmitted by means of the angular transmitter 7' and the platform 4' is driven by means of the nut 31 which is fixedly mounted on the platform 4' and which engages the lead screw 30.

The present controlled in-process system can cut the time of manufacture of the cam to only 10–30 minutes per 200" of cam length. Compare this method to the present typical technique, described below:

(1) The operator must make a run, and stop at different increments. He must do this at least three times per each axis.

(2) He must take the average of three readings per each point and record this in a table.

(3) He then plots the above on a chart and draws a line through the points to approximate a cam that can then be manufactured.

(4) From the above charts, the cam must be generated. Obviously, processing papers are required including release, scheduling, set-up, and manufacture.

(5) This cam should be inspected prior to installation.

(6) The cam must then be installed in the machine. Checking of the axis must then be performed. Measurements are made at predetermined intervals. Three readings per each point per axis must be taken.

(7) The operator averages the readings at each point and then records the average on his final report on the corrected machine, which must meet the specification of acceptance criteria.

The above procedure is highly cumbersome. It is possible for an operator to make an error in computation or transfer of data. It is also possible for the machine operator to make an error, which causes an expensive re-manufacture of a new cam.

The present automatic cam manufacture technique eliminates the above steps. It minimizes the possibility of error. The procedure is illustrated below:

(1) Set-up cam on base.

(2) Start platform from one end. The cutter moves at constant speed generating the cam in accordance with the laser generated errors.

(3) At the end of run, remove cam, physically inspect and debur it, then place back into proper position in machine, with proper automatic correction.

(4) Make another test run recording errors using the chart recorder (or printer). Note that the chart recorder presents an output which is an average of more than one reading. This system is more accurate than stopping and readout, since as the machine stops, it can stop anywhere in the dead zone of the control system. However, the use of the automatic checking system is direct since it uses the error pulses as they are generated eliminating the control errors.

The techniques described above can save valuable time. It is estimated that the cost of manufacturing the cam will now be a fraction of its present cost. It automatically provides a chart which is a valuable document as an inspection record. It definitely provides a more accurate means of manufacture, which results in an improved product.

I claim:

1. Means to automatically cut compensating cams for precision lead screw work pieces comprising,
 a base,
 means to rotatably mount a lead screw on said base, means connected to said lead screw for rotation thereof,
a cam body fixedly mounted on said base parallel to said lead screw,
a platform being driven by the lead screw and being movable along said base in a direction parallel to the axes of said lead screw and said cam,
a cutter mounted on said platform,
means for feeding said cutter transversely to said cam body,
an angular transmitter connected to said lead screw and adapted to transmit signals proportional to the angular rotation of said lead screw,
interferometer means adapted to measure the linear travel of said platform,
means connected to said angular transmitter to convert said angular information to computed linear travel,
means connected to said angular conversion means and said interferometer means to measure the difference between said computed linear travel and said interferometer measured linear travel of said platform,
servo means connected to said cutter and being responsive to said difference between the computed linear and said measured linear travel to control said transverse cutter movement and thereby regulate the depth of cutting of said cam.

2. Means to automatically cut compensating cams for precision rack work pieces comprising,
a base,
means to mount a rack on said base,
a cam body fixedly mounted on said base parallel to said rack,
a platform having a pinion gear mounted thereon and said pinion gear meshing with said rack,
means connected to said pinion gear for rotation thereof,
said platform being movable along said base in a direction parallel to the axes of said rack and said cam,
a cutter mounted on said platform,
means for feeding said cutter transversely to said cam body,
an angular transmitter connected to said pinion and adapted to transmit signals proportional to the angular rotation of said pinion,
interferometer means adapted to measure the linear travel of said platform,
means connected to said angular transmitter to convert said angular information to computed linear travel,
means connected to said angular conversion means and said interferometer means to measure the difference between said computed linear travel and said interferometer measured linear travel of said platform,
servo means connected to said cutter and being responsive to said difference between the computed linear and said measured linear travel to control said transverse cutter movement and thereby regulate the depth of cutting of said cam.

3. Apparatus as in claim 1 having environmental correction means connected to said difference measuring means.

4. Apparatus as in claim 1 having error recording means connected to said difference measuring means.

5. Apparatus as in claim 1 wherein said difference measuring means includes means to convert output from said interferometer means to linear measurements.

6. Apparatus as in claim 5 having a digital to analog converter associated with said difference measuring means to supply information received from said difference measuring means to said servo means,
said servo means including a servo motor,
and a servo amplifier connected to said digital to analog computer, the output of said servo amplifier being connected to said servo motor, and feed back means connected to said servo motor, the output of said feed back means being connected to the input of said servo amplifier.

7. Apparatus as in claim 2 having environmental correction means connected to modify said interferometer measuring means.

8. Apparatus as in claim 7 having error recording means connected to said difference measuring means.

9. Apparatus as in claim 7 wherein said difference measuring means includes means to convert output from said interferometer means to inches.

10. Apparatus as in claim 7 having a digital to analog converter associated with said difference measuring means to supply information received from said difference measuring means to said servo means, said servo means including a servo motor, and a servo amplifier connected to said digital to analog converter, the output of said servo amplifier being connected to said servo motor, and feed back means connected to said servo motor, the output of said feed back means being connected to the input of said servo amplifier.

11. Apparatus as in claim 1 wherein said angular transmiter transmits signals proportional to the cumulative angular rotation of said lead screw, and said interferometer means is adapted to measure the cumulative linear travel of said platform.

12. Apparatus as in claim 11 wherein said means connected to said angular transmitter is adapted to convert said angular information to cumulative computed linear travel.

13. Apparatus as in claim 2 wherein said angular transmitter transmits signals proportional to the cumulative angular rotation of said lead screw, and said interferometer means is adapted to measure the cumulative linear travel of said platform.

14. Apparatus as in claim 2 wherein said means connected to said angular transmitter is adapted to convert said angular information to cumulative computed linear travel.

15. Apparatus having means to automatically control the machining of a workpiece member comprising: a base, means for mounting a machine tool member and said workpiece member on said base, rotating drive means associated with one of said members for providing relative linear movement between said members, movement transmitter means to measure angular motion of said rotating drive means and transmit signals proportional thereto, interferometer means adapted to measure the linear travel of said one member, means connected to said transmitter means to convert said transmitted signals to computed linear travel, means connected to said conversion means and said interferometer means to measure the difference between said computed linear travel and said interferometer measured linear travel of said one member, and said means for automatically controlling the machining of said workpiece member being responsive to said measured difference.

16. Apparatus as in claim 15 having environmental correction means connected to said interferometer means to modify the output of said interferometer means.

17. Apparatus as in claim 15 having servo means responsive to said difference between the computed linear and said measured linear travel to control the machining of said workpiece.

18. Apparatus having means to automatically control the machining of a workpiece member comprising,
a base,
means for mounting a machine tool member and said workpiece member on said base,
drive means associated with one of said members for providing relative linear motion between said members,
movement transmitter means to measure and transmit signals proportional to the nominal linear movement of said one member,
interferometer means adapted also to measure linear travel of said one member, means connected to said transmitter to convert said transmitted signals to computed nominal linear travel, and means connected to said conversion means and said interferometer means to measure the difference between said computed linear travel and said interferometer measured linear travel of said one member, said means for automatically controlling the machining of said workpiece member being responsive to said measured difference.

References Cited

UNITED STATES PATENTS

| 2,937,325 | 5/1960 | Garber | 318—28 |
| 3,204,532 | 9/1965 | Budnick | 90—4 |
| 3,324,365 | 6/1967 | Jones | 318—28 |

GIL WEIDENFELD, Primary Examiner

U.S. Cl. X.R.

90—13R, 15; 318—632